March 17, 1931. J. LILLEGRAVEN 1,797,005
FISHING TACKLE
Filed April 11, 1930
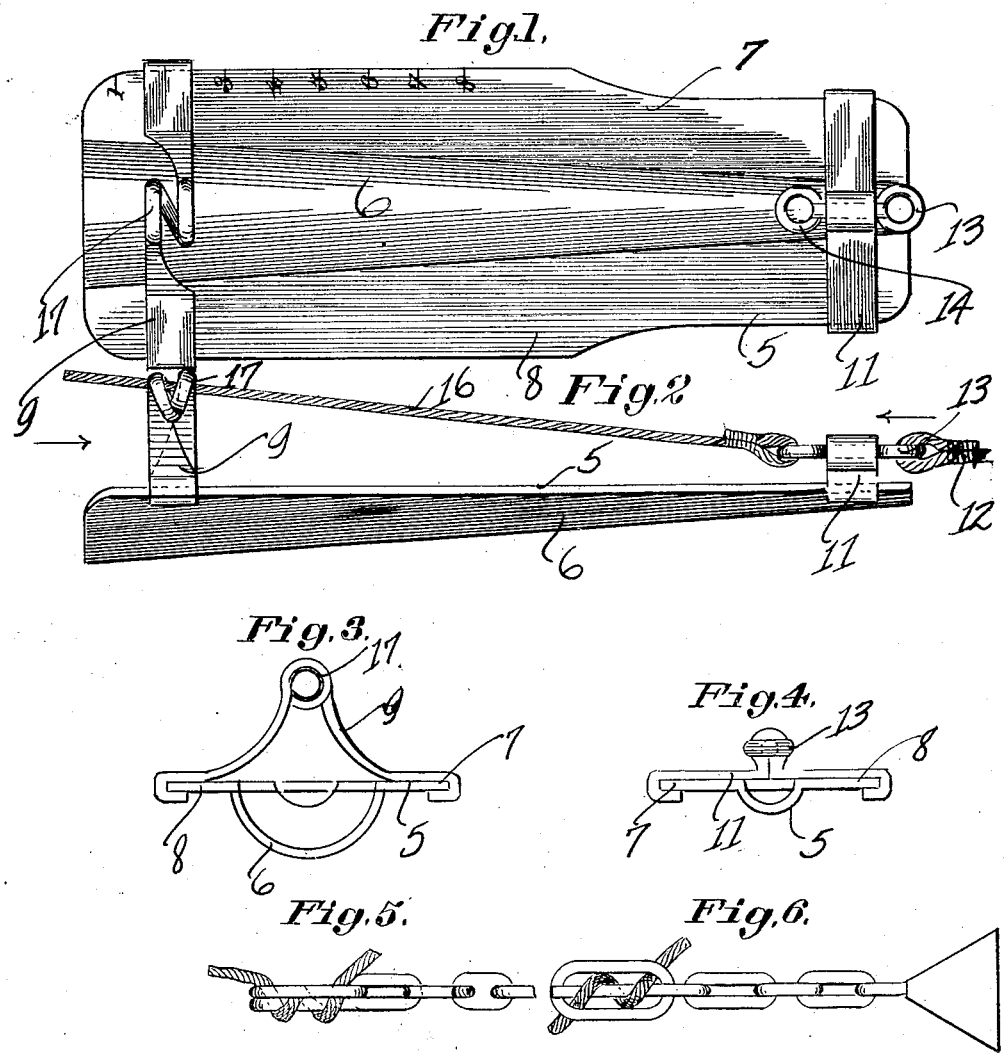
Inventor,
JENS LILLEGRAVEN
by Victor J. Evans
Attorney.

Patented Mar. 17, 1931

1,797,005

UNITED STATES PATENT OFFICE

JENS LILLEGRAVEN, OF KENNECOTT, TERRITORY OF ALASKA

FISHING TACKLE

Application filed April 11, 1930. Serial No. 443,519.

This invention relates to improvements in fishing tackle and has particular reference to a diver.

The principal object of this invention is to produce a device wherein the diving or sink of the bait below the surface of the water may be readily controlled particularly when a trolling line is being employed.

Another object is to produce a device which is simple in construction.

A further object is to produce a device which is neat in appearance.

A further object is to produce a device which will cause a minimum amount of splash when casting.

A still further object is to produce a device which may be readily attached or detached from the fishing line.

Other objects and advantages will be apparent during the course of the following description.

In the accompanying drawings forming a part of this specification and in which like numerals are employed to designate like parts throughout the same, Figure 1 is a top plan view of my invention, Figure 2 is a side elevation thereof, Figure 3 is a front end elevation, Figure 4 is a rear end elevation, and Figures 5 and 6 show the manner in which the device may be attached to a line at any point along the line.

In fishing it is desirable that the bait or lure being used be kept a definite distance below the surface of the water as it is a well known fact that many fish swim at certain depths and when trolling it is hard to maintain the hook at the proper depth unless some means is provided such as I have done.

In the accompanying drawings wherein for the purpose of illustration is shown a preferred embodiment of my invention, the numeral 5 designates a plate having a central portion which is counter-sunk and designated at 6. This counter-sunk portion is semi-circular and tapers from the front end toward the rear end as illustrated in Figures 1 and 2. This construction provides side fins 7 and 8 to which a front slider 9 is slidably secured and to which a rear slider 11 is slidably secured. A line 12 connects to an eye 13 carried in the rear slider 11. A similar eye 14 connects to the line 16 which passes through an eye 17 formed in the front slider 9.

The result of this construction is that when the device is placed upon the line and the line is towed through the water the angle of pull may be regulated by moving the slider 9 along the device to definite points as indicated by the indicia shown in Figure 1, therefore if it is desired to troll it a definite depth, say five feet the slider 9 is moved to the indicia 5 and the line is cast, then by trolling the line will assume the angle between the eye 14 and eye 17 and the plate will be drawn through the water in a level position thus maintaining the bait at the predetermined depth. When it is desired to use a light bait which would not sink and would not cause sufficient drag, my device may be attached at any desired point along the line as shown in Figures 5 and 6 and the desired result accomplished.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a device of the character described, a plate, said plate having a counter-sunk central portion and movable slides carried thereon for the purpose of controlling the movement of said device in the manner described.

2. In a device of the character described, a plate, a central portion counter-sunk therein, said counter-sink being tapered from end to end and a pair of slidable members carried on said plate and indicia formed on said plate whereby one of said slides may be adjusted to a definite position on said wings.

3. In a device of the character described, a plate having side wings, a pair of sliders secured to said wings and slidable thereon, indicia carried on one of said wings for the purpose of designating the definite position of one of said sliders and eyes formed on said sliders whereby a line may be secured therethru.

In testimony whereof I affix my signature.

JENS LILLEGRAVEN.